3,666,554
MANUFACTURE OF ELECTROPHOTOGRAPHIC PLATE

Kay Keiji Kanazawa and George Bryan Street, San Jose, Calif., assignors to International Business Machines Corporation, Armonk, N.Y.
No Drawing. Filed Dec. 10, 1970, Ser. No. 97,007
Int. Cl. G03g 5/04, 13/22
U.S. Cl. 117—230          4 Claims

ABSTRACT OF THE DISCLOSURE

A process for preparing an electrophotographic plate by evaporating under vacuum onto a conductive substrate held at a temperature of from 50° C. to 80° C. a layer consisting essentially of equal atomic proportions of selenium and sulfur.

FIELD OF THE INVENTION

This invention is concerned with a process for manufacturing plates used in electrophotographic reproduction processes. In particular, it is concerned with the manufacture of such a plate having as a photoconductive element a layer consisting essentially of equal atomic proportions of selenium and sulfur.

PRIOR ART

Canadian Patent No. 712,992, issued July 6, 1965 to Lawes et al., discloses a selenium-sulfur photoconductive layer consisting of a major proportion of selenium and a minor portion of sulfur. More specifically, the patent requires a mixture of between 95 percent and 75 percent by weight of selenium and between 5 percent and 25 percent by weight of sulfur. Other references disclosed in that patent refer to other photoconductive layers comprising both selenium and sulfur, but they are obviously more remote from the present invention. The Canadian patent is distinguished from the present invention in that it specifies a minimum concentration of selenium above that used in the present invention. Furthermore, the Canadian patent does not teach the temperature required by the process of the present invention.

SUMMARY OF THE INVENTION

The present invention concerns a process for preparing an electrophotographic plate. An electroconductive substrate is coated with a layer which consists essentially of equal atomic proportions of selenium and sulfur. The atomic weight of selenium is 78.96 and the atomic weight of sulfur is 32.064. An equal atomic proportion of selenium and sulfur therefore corresponds to 71.1 percent by weight selenium and 28.9 percent by weight sulfur.

According to the process of the present invention, equal atomic proportions of selenium and sulfur are deposited on a conductive substrate by means of an evaporation process under vacuum. The entire preparation is conducted in such a way as to improve the homogeneity and to facilitate reaction between the sulfur and the selenium in order to maximize the formation of $Se_{8-x}S_x$ molecular ring compounds, particularly where $x=4$. This objective is accomplished by melting together very pure selenium and very pure sulfur under vacuum ($10^{-6}$ torr) in a sealed tube which is rotated. The molten mass is then cooled and allowed to solidify. This resulting solid selenium-sulfur material is then evaporated at temperatures of approximately 200° C. under an initial vacuum of $10^{-6}$ torr onto various substrates, including flexible materials like aluminum and aluminum covered polyethyleneterpthalate (available commercially from DuPont under the trademark Mylar). The substrate is at a distance of about 10 to 13 cms. from a molybdenum boat used to hold the materials being evaporated. The temperature of the substrate during evaporation is important. It is essential that the temperature be held between 50° C. and 80° C. Particularly outstanding results have been obtained at 55° C. The process takes aproximately one hour. The photoconductive films obtained by the process of the present invention are very smooth, shiny, flexible, and tough, and therefore have the physical properties necessary for use in the electrophotographic process, either in the form of a flexible belt or on a fixed drum. These films of selenium sulfide are relatively trap free and accept hundreds of volts of charge under a corona and the charge retention time in the dark, measured by the time to decay to one-half the initial plate, is in excess of a thousand seconds. In general, the films are approximately 15–30 microns thick.

The injection yield, defined as the ratio of the flux of charged carriers to the flux of incident photons during the initial discharge, is 0.3 in the short wave-length region (350 m.). The film prepared on a substrate held at 55° C. had a cut-off wavelength (defined as that wavelength at which the yield is down by one-fifth of its short wave-length) of 450 mµ. The spectral response can be extended by 0.15 ev. by increasing the substrate temperature during deposition to 80° C.

It is a particularly valuable and unexpected advantage of the present invention that, for reasons which are not understood, the layers of selenium sulfide so prepared are particularly compatible with an overcoating layer containing tellurium. In a preferred modification of the present invention, such a tellurium containing overcoat is applied and as a result thereof are obtained exremely sensitive electrophotographic plates.

The electrophotographic properties of these selenium sulfur films is further improved by the evaporation of a thin layer (about 1 micron thick) of a selenium-tellurium alloy on the light incident surface. This selenium-tellurium layer may be co-evaporated with the selenium-sulfur material during the final part of the deposition process, or the selenium-tellurium layer may be evaporated on top of the selenium sulfide after this layer is completed. Alternatively, tellurium alone may be co-evaporated with the selenium sulfide during the final part of the deposition of the selenium sulfide. The effect of this modification of the upper, light incident layer is to increase the panchromaticity and electrophotographic speed of the selenium sulfur photoconductive layer.

The influence of the co-evaporation of selenium-tellurium or tellurium during the final phase of the film deposition can further extend the spectral response by an additional 0.5 ev.

The net effect of the extension of the spectral response is most clearly seen by comparing the time to decay one-half of the initial voltage under "white light" conditions. The samples were compared both under white incandescent illumination and under white fluorescent illumination. The results are tabulated below:

| Sample description | $T_{1/2}$(seconds) | |
|---|---|---|
|  | Incandescent | Fluorescent |
| Prepared on 55° C. substrate | 3.3 | 0.96 |
| Prepared on 80° C. substrate | 1.1 | 0.41 |
| Prepared with Se-Te overlayer | 0.16 | 0.12 |
| Prepared with Te-rich overlayer | 0.075 | 0.07 |

Although the panchromaticity of the samples with the selenium-tellurium overlayer is nearly the same as that with the tellurium rich overlayer, the yield of the latter is uniformly about a factor of three larger than the former, resulting in even greater electrophotographic speed.

What is claimed is:
1. A process for preparing an electrophotographic plate, said process comprising depositing, by evaporation under vacuum onto an electrically conductive substrate held at a temperature of from 50° C. to 80° C., a layer consisting essentially of 71.1% by weight selenium and 28.9% by weight sulfur.
2. A process as claimed in claim 1 wherein the temperature of the substrate is held at 55° C.
3. A process as claimed in claim 1 wherein the deposited layer contains a substantial amount of the molecular ring compound having the formula $Se_4S_4$.
4. A process as claimed in claim 1 wherein the selenium-sulfur layer is subsequently covered with a tellurium containing layer.

References Cited
UNITED STATES PATENTS
3,121,006   2/1964   Middleton et al. _____ 96—1.5

WILLIAM L. JARVIS, Primary Examiner

U.S. Cl. X.R.

117—201, 217; 96—1.5